US005124711A

United States Patent [19]

Sorais et al.

[11] Patent Number: 5,124,711

[45] Date of Patent: Jun. 23, 1992

[54] DEVICE FOR AUTO-ADAPTIVE DIRECTION AND POLARIZATION FILTERING OF RADIO WAVES RECEIVED ON A NETWORK OF AERIALS COUPLED TO A RECEIVER

[75] Inventors: Daniel Sorais, Courbevoie; Jean-Christophe Seguineau, Chatou, both of France

[73] Assignee: Thomson-CSF, Puteaux, France

[21] Appl. No.: 571,555

[22] PCT Filed: Dec. 22, 1989

[86] PCT No.: PCT/FR89/00672

§ 371 Date: Aug. 28, 1990

§ 102(e) Date: Aug. 28, 1990

[87] PCT Pub. No.: WO90/07802

PCT Pub. Date: Jul. 12, 1990

[30] Foreign Application Priority Data

Dec. 30, 1988 [FR] France ............................... 88 17482

[51] Int. Cl.[5] ......................... H01Q 3/00; G01S 3/16; G01S 5/04

[52] U.S. Cl. .................................... 342/361; 342/383; 342/448

[58] Field of Search ............... 342/361, 380, 383, 445, 342/448, 362-364

[56] References Cited

U.S. PATENT DOCUMENTS 4,612,549 9/1986 Geyer, Jr. et al. .................. 342/379

4,675,685 6/1987 Finken ................................ 343/708

FOREIGN PATENT DOCUMENTS 1222520 2/1971 United Kingdom .

OTHER PUBLICATIONS

Lamberty et al. Interference Suppression Using an Adaptive Polarization Combiner, Proc. of 1987 Antenna Applications Symposium, Sep. 23-25, 1987 pp. 1-15.

Bull et al. A Broadband Electrically Small Adaptive Array, 1986 Int. Symposium Digest Antennas and Propagation, Jun. 8-13, 1986 pp. 993-996.

WO, A 86/01340 (Ostereichisches Forschungszentrum Seiberdorf) Feb. 27, 1986, see FIGS. 1, 3, 4, 6, 7, p. 3, lines 4-10; p. 4, line 10-p. 6, line 8.

IEEE Transactions on Aerospace and Electronic Systems, vol. AES-9 No. 6, Nov. 1973, IEEE, (New York, US), H. S. Lu: "Polarization Separation by an adaptive filter", pp. 954-956.

IEEE Transactions on Aerospace and Electronic Systems, vol. AES-21, No. 6, Nov. 1985, IEEE, (New York, US), Y. Ogawa et al.: "An LMS adaptive array using a pilot signal", pp. 777-782.

*Primary Examiner*—Gregory C. Issing

*Attorney, Agent, or Firm*—Cushman, Darby & Cushman

[57] ABSTRACT

The apparatus is an antenna system for autoadaptive direction and polarization filtering of radio waves traveling through an HF ionospheric channel and generating an output signal for coupling to a receiver. First and second crossed loop antenna elements having first and second output terminals, respectively, are disposed around a common axis. A filar antenna element has a longitudinal axis along the common axis. The filar antenna element has a first end terminal situated at the same phase center as the first and second output terminals. A multiplier circuit multiplies each value output from the first and second output terminals and the first end terminal by a corresponding complex weighting coefficient. The complex weighting coefficients are adjustable as a function of variations of polarization of a radio wave, and azimuthal and site arrival directions of the radio wave. A summation circuit sums the output products from the multiplier circuit to form a resultant signal which can be exploited by a receiver with a maximum useful signal/noise ratio.

12 Claims, 8 Drawing Sheets

DEVICE FOR AUTO-ADAPTIVE DIRECTION AND POLARIZATION FILTERING OF RADIO WAVES RECEIVED ON A NETWORK OF AERIALS COUPLED TO A RECEIVER

BACKGROUND OF THE INVENTION

The present invention relates to a device for auto-adaptative direction and polarization filtering of radio waves received on a network of aerials coupled to a receiver.

The invention is applied in particular to the construction of an interference elimination device for receivers of electromagnetic waves travelling through the HF ionospheric channel.

It is known that a tactical high frequency reception aerial must in particular enable any user to establish radio connections with various transmitting stations, and to simultaneously hear the transmissions from the other users of the high frequency channel.

Bearing in mind the congestion of the high frequency channel, the receiver must be able to reject the signals coming from sources of interference, be they intentional or not.

However, the known tactical high frequency adaptative aerial networks, generally formed from several suitably spaced vertical whips, do not enable exploitation of the polarization of the ionospheric waves. Whilst the performance levels expected from an adaptative aerial formed from three orthogonal dipoles, which does not have the shortcomings of the whips, are described in an article by RTE COMPTON entitled "The tripole antenna: an adaptative array with a full polarization flexibility" (IEEE trans antenne and propagation. Vol.: AP 29 No. 6 Nov. 81), the aerial which is described therein has the tactical disadvantage of having to be placed at the top of a mast so that the radiation patterns of the horizontal dipoles are correct. Moreover, as it is technologically very difficult to suppress the high frequency currents circulating in the external parts of the coaxial cables connecting the dipoles of the aerial to the receiver, the performance levels expected of this aerial configuration are, in practice, not obtained.

SUMMARY OF THE INVENTION

The aim of the invention is to overcome the above-mentioned disadvantages.

To this end, the subject of the invention is a device for auto-adaptative direction and polarization filtering of radio waves received on a network of aerials coupled to a receiver. The device is characterized in that the network of aerials is formed by Q crossed loops disposed around a common axis in accordance with adjacent dihedrons of equal angular value, and by a rectilinear filar aerial of longitudinal axis merged with the common axis. The Q loops and the rectilinear filar aerial have a same phase centre situated at the output terminals of the Q loops and at one end terminal of the filar aerial. The Q loops and filar aerial are respectively coupled to an operand input of a summation circuit with Q+1 inputs across Q+1 multiplication circuits for multiplying a value $X_j$ provided by each loop and the filar aerial by a complex weighting coefficient $W_j$, which is adjustable as a function of the variations of the polarization of the received ionospheric wave, its azimuthal, and site arrival direction. The addition of the products $X_j.W_j$ gives a resultant signal which can be exploited by the receiver with a maximum useful signal/noise ratio.

The aerial according to the invention has the main advantages of being auto-adaptative, having a wide band, reduced dimensions, and possessing radiation properties which are suitable for all distances less than 2000 kilometers.

The active receiving structure, obtained by virtue of the amplifiers placed at the phase centre of each aerial, enables obtainment of a wide band aerial operation on an extensive range of frequencies comprised between 2 and 30 MHz. Moreover, the crossed loops and the monopole which form the passive part of the antenna enable obtainment of distinct amplitude/phase responses for any elliptically polarized ionospheric wave transmitted in accordance with a specified site angle and azimuth. Because of this, the linear combination of these responses enables elimination of interference in adaptative receiving mode and diminution of the fading of the useful signal in the absence of interference.

BRIEF DESCRIPTION OF THE DRAWINGS

Other characteristics and advantages of the invention will emerge hereinafter with the aid of the description which follows, made with reference to the attached drawings which show.

DESCRIPTION OF THE PREFERRED EMBODIMENTS

Figure 1:
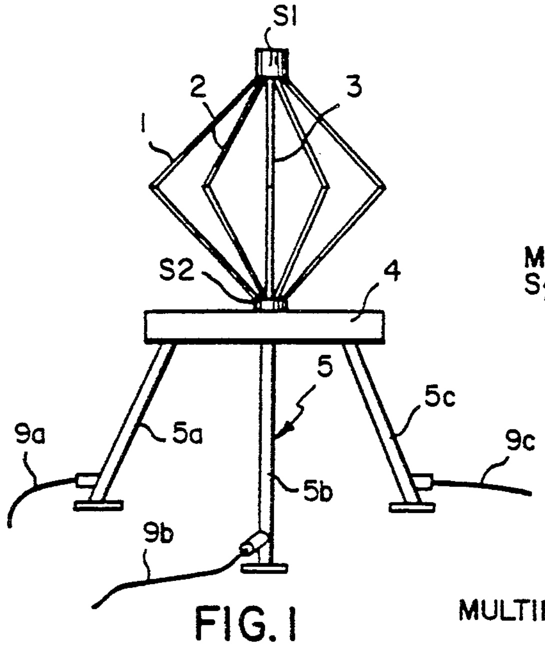
FIG. 1, an auto-adaptative aerial structure forming the device according to the invention, FIG. 2, an embodiment of a device for controlling the aerial structure in FIG. 1 so as to effect the function of direction and polarization filtering of the ionospheric waves arriving at the aerial, FIGS. 3*a* through 3*k*, graphs representing the influence of the relative polarizations of the useful incident waves and of the interference, FIGS. 4*a* and 4*b*, a configuration in a three-dimensional space of a useful plane incident wave and of a plane wave representing interference, in relation to an aerial according to the invention, FIG. 5, the projection location of the electric field vector in the yoz plane in FIG. 3, of an elliptically polarized wave, FIGS. 6 and 7, two embodiments of the amplifiers shown in FIG. 2.

The aerial according to the invention which is shown in FIG. 1 is composed of two rectangular loops 1 and 2 and a filar aerial 3. The loops 1 and 2 have virtually identical dimensions and cut at right-angles along a common diagonal connecting two of their opposite vertices labelled s1 and s2 in FIG. 1. The filar aerial 3 possesses a longitudinal axis merged with the common diagonal passing through the vertices s1 and s2 and is fixed via its ends to each of the two vertices s1 and s2 respectively, by any known fixing pieces (not shown) constructed from a dielectric material. The assembly is fixed via the vertex s2 to a flat plinth 4 perpendicular to the direction s1 s2 of the vertices. The plinth 4 rests on a tripod 5 formed by three tubes 5*a*, 5*b* and 5*c* so as to enable the aerial to be placed on the ground.

Figure 2:
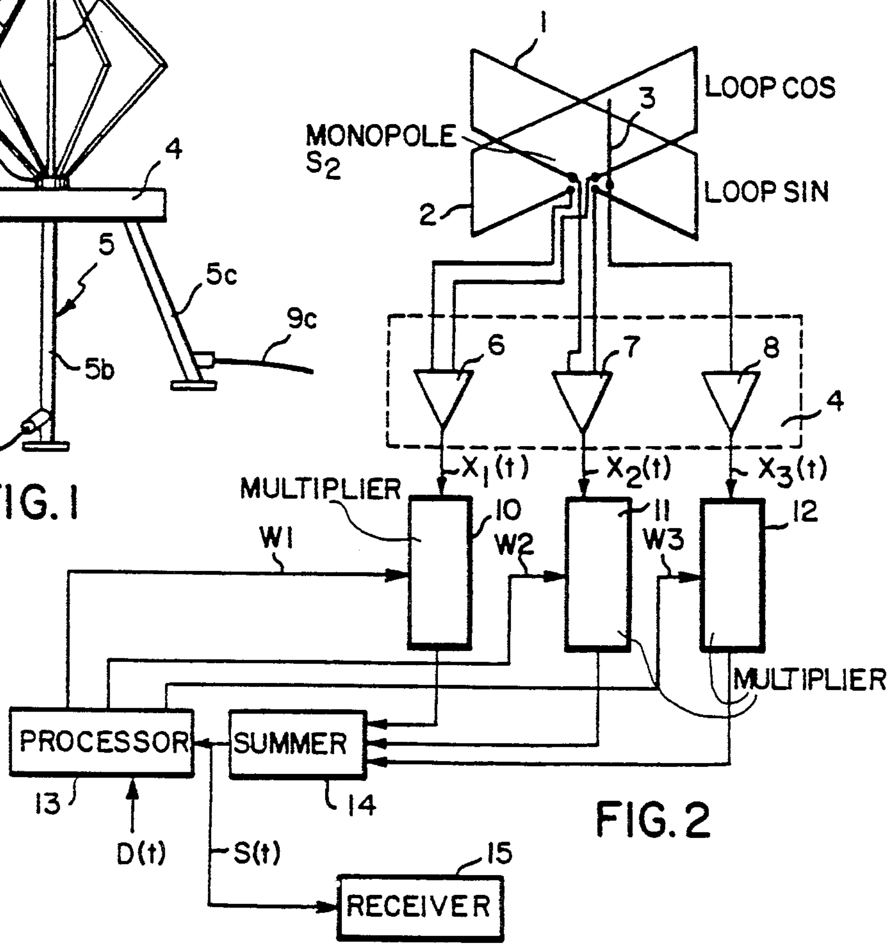

A control device for effecting the functions of direction and polarization filtering of the waves arriving at the aerial is shown in FIG. 2. In this figure, the loops 1 and 2 are connected, via their vertex s2 and their output terminals, to two symmetric amplifiers 6 and 7. The filar aerial 3 is connected, via the same vertex s2 and via its output terminal, to a nonsymmetric amplifier 8. This disposition permits a same phase centre for the three active antennae formed by the loops 1 and 2 and the filar aerial 3. The amplifiers 6, 7 and 8 are placed inside the plinth 4, represented by a closed dashed line, and are supplied in the manner shown in FIG. 1 via coaxial cables 9*a*, 9*b* and 9*c* inserted inside tubes 5*a*, 5*b* and 5*c* of the tripod 5. The filar aerial 3 forms an active dipole with the metal tubes 5*a*, 5*b* and 5*c* and the nonsymmetric amplifier 8.

The outputs of the amplifiers 6, 7 and 8 are connected respectively to a first operand input of complex number multiplication circuits, these circuits being labelled respectively 10 to 12 in FIG. 2. Complex weights or signals $W_1$, $W_2$ and $W_3$, in the form $W_i = k.e^{j\phi_i}$, are applied respectively on the second operand inputs of the multiplication circuits 10, 11 and 12 by the respective outputs of a signal processor 13. The outputs of the multiplication circuits 10 to 12 are connected respectively to operand inputs of a summation circuit 14. The result of the summation provided by the summation circuit 14 is applied on a signal input of the processor 13 and on the input of a radio wave receiver 15.

It is known that for a given HF propagation path the polarization of the wave incident on the receiving aerial depends on the coordinates of the point of departure from the ionosphere as well as on the direction of this departing wave relative to the earth's magnetic field. It thereby follows that, whatever the polarizations of the transmissions, the useful signal and the interference which are received by the adaptative aerial generally have distinct elliptic polarizations. This particular feature of the ionospheric channel is exploited by the processor 13 which, after detection of the summation signal provided by the summer 14, executes a program which enables determination of the complex weights $W_1$, $W_2$ and $W_3$ which render maximum the quality of reception of a useful signal in the presence of interference. The algorithm used for the implementation of the program is of the type known by the title "LMS". LMS is the abbreviation of "Least Mean Square". A description of this algorithm can be found in the article by R. T. COMPTON Jr, R. J., HUSS W. G. Swarner and A. A. Kalensky "Adaptative array for communication systems: an overview of research at "The Ohio State University" IEEE Trans Antennas Propagat, Vol. AP 24, pages 599 to 607, Sep. 1976. Adapted to the present invention, the execution of this algorithm enables the signal/noise ratio at the output of the summation circuit 14 to be rendered maximum.

Returning to FIG. 2, if $X_{1(t)}$, $X_{2(t)}$ and $X_{3(t)}$ designate respectively the voltages of the signals leaving the amplifiers 6, 7 and 8, and W the matrix of the complex weights ($W_1$, $W_2$, $W_3$), the signal $S_{(t)}$ provided at the output of the summation circuit 14 appears connected by the relation: $S_{(t)} = W^t X_{(t)}$ (1) in which $W^t$ is the transposed matrix of the matrix W, and $X_{(t)}$ is the matrix of the input voltages $X_{1(t)}$, $X_{2(t)}$ and $X_{3(t)}$.

Depending on the values taken by the complex weights $W_1$, $W_2$ and $W_3$ the signal $S_{(t)}$ approaches more or less the desired useful signal $D_{(t)}$ which may be recognized by any known means (not shown) on condition that a "marker" exists in the modulation of the useful signal.

On comparing $D_{(t)}$ and $S_{(t)}$, the processor 13 calculates an error signal $E_{(t)}$.

Before carrying out this calculation, the processor 13 carries out, in a known manner, a sampling of the waveforms of the signals $D_{(t)}$ and $S_{(t)}$. An error signal $E_{(j)}$ is then calculated for each sample j corresponding to the two signals, such that:

$$E_{(j)} = D_{(j)} - S_{(j)} = D_{(j)} - W^t X_{(j)} \tag{2}$$

The processor 13 then calculates the values of the weights $W_1$, $W_2$ and $W_3$ so that at each instant the response of the device is equal, or the closest possible, to the desired response.

This is obtained when:

$$W^t X_1 = D_{(1)}$$

$$W^t X_j = D_{(j)}$$

$$W^t X_N = D_{(N)} \tag{3}$$

The system of equations to be resolved is therefore a system of N equations with three unknowns.

On choosing $N >> 3$ it is of interest to obtain a solution in the form:

$$E_{(j)} = D_{(j)} - W^t X_{(j)} \tag{4}$$

which renders minimum the relation $$\sum_{j-1}^{N} E^2_{(j)} \tag{5}$$

The LMS algorithm enables this minimum value to be obtained by iteration, by calculating at each iteration the relation:

$$W_{(j+1)} = W_{(j)} + k\bar{\nabla}_{(j)}$$

$W_{(j)}$ is the weighting vector before adaptation $W_{(j+1)}$ is the weighting vector after adaptation $K_s$ is a constant monitoring the rate of convergence and the stability ($k_s < 0$)

and $$\bar{\nabla}_{(j)} = \nabla[E^2_{(j)}] = 2E_{(j)}\nabla[E_j]$$

since $$\nabla[E_{(j)}] = \nabla[D_{(j)} - W^t X_{(j)}[$$

or has $$\bar{\nabla}_{(j)} = -2E_{(j)}X_{(j)}$$

and $$W_{(j+1)} = W_j - 2k_s E_{(j)} X_{(j)} \tag{6}$$

It goes without saying that the previously described example of implementation of the device according to the invention may be extended to other implementations comprising any number Q of crossed loops disposed around a common axis according to adjacent dihedrons of equal angular value and a rectilinear filar aerial of longitudinal axis merged with the common axis. The assembly of loops and filar aerials thereby have the same phase centre situated at the signal output terminals of the Q loops and of the filar aerial. In this case, the equation system (3) is still valid and reduces to a system of N equations with Q+1 unknowns in which the coefficients $W_1$ to $W_{Q+1}$ are the unknowns It is also seen that the invention is not limited to the implementation of a network made exclusively from rectangular-shaped loops, it will be clearly evident to those skilled in the art that the principle of the invention itself remains applicable to other types of loops, of circular, diamond or square shape in particular.

Figure 3A:
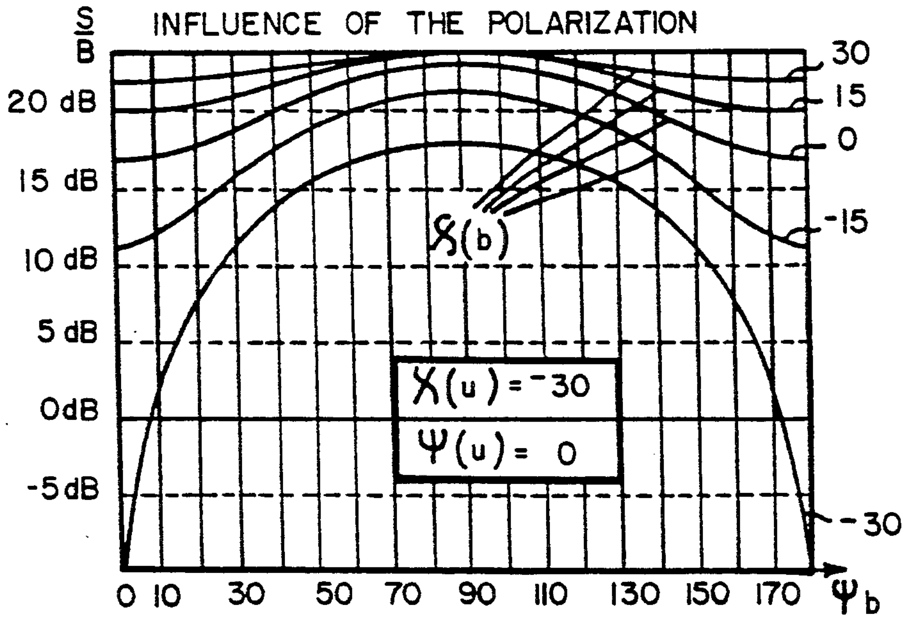
Figure 3B:
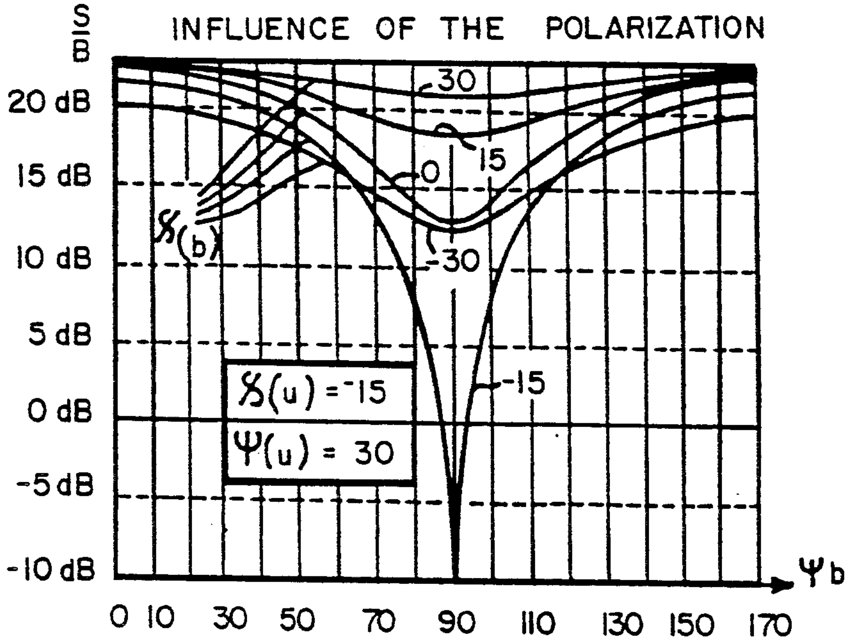
Figure 3C:
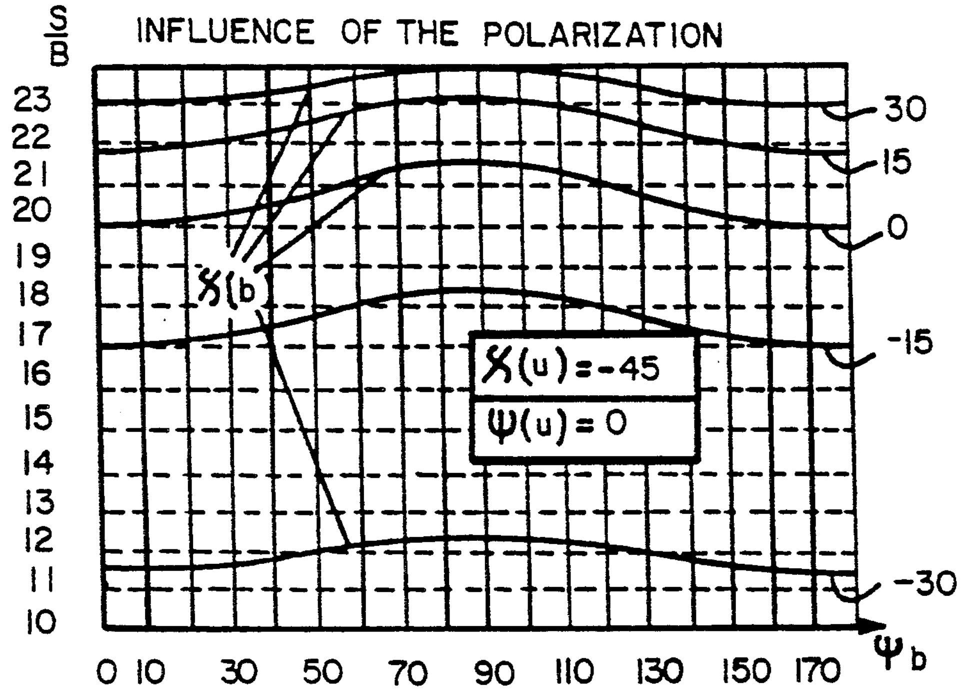
Figure 3D:
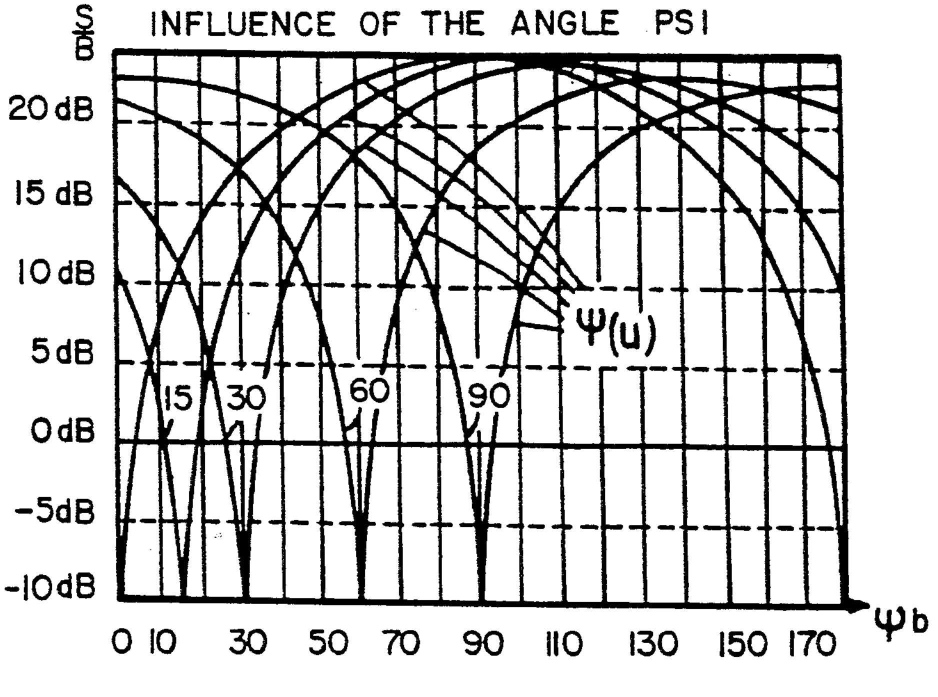
Figure 3E:
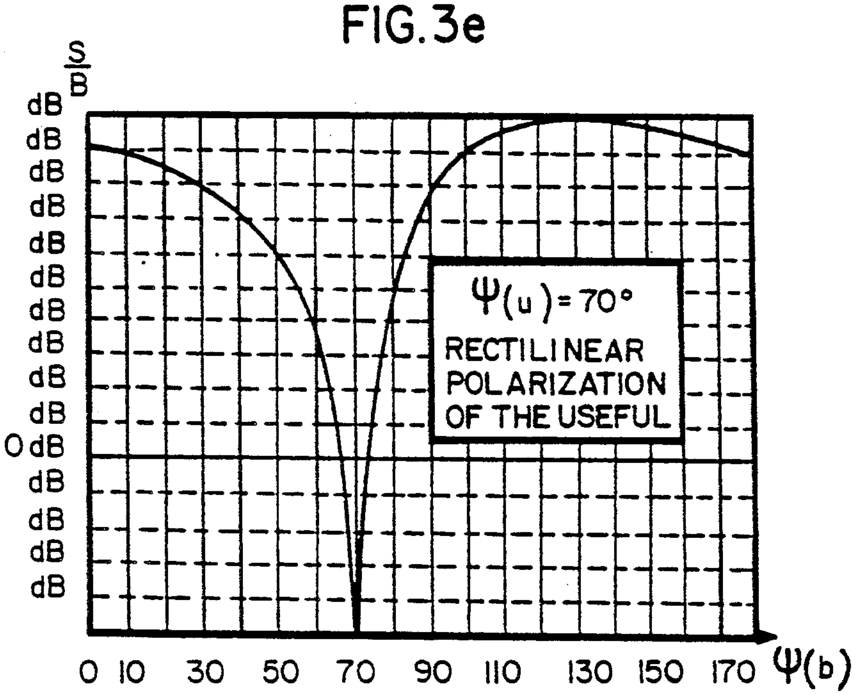
Figure 3F:
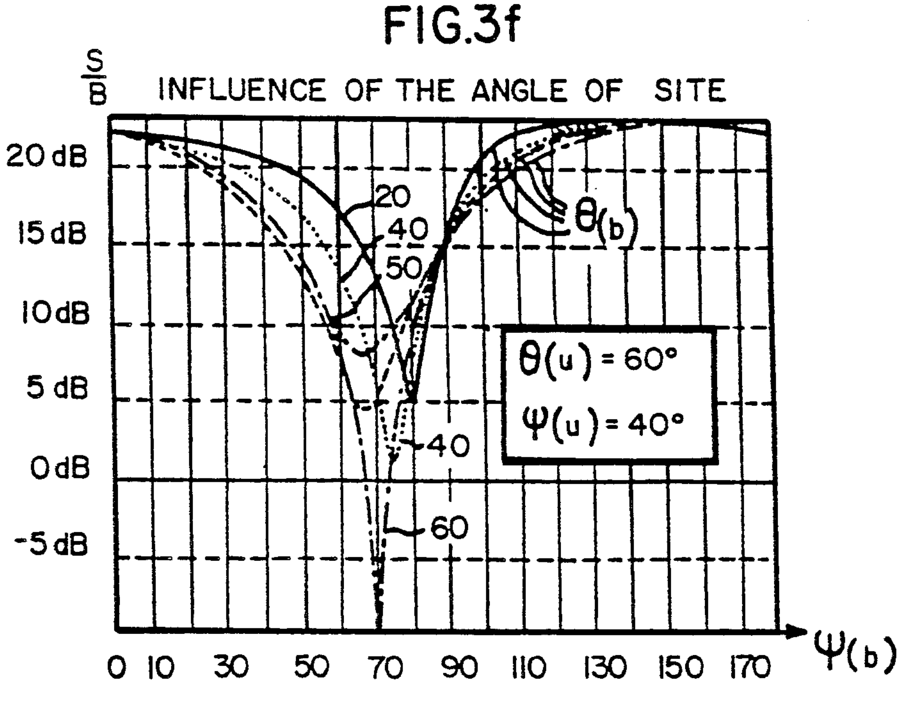
Figure 3G:
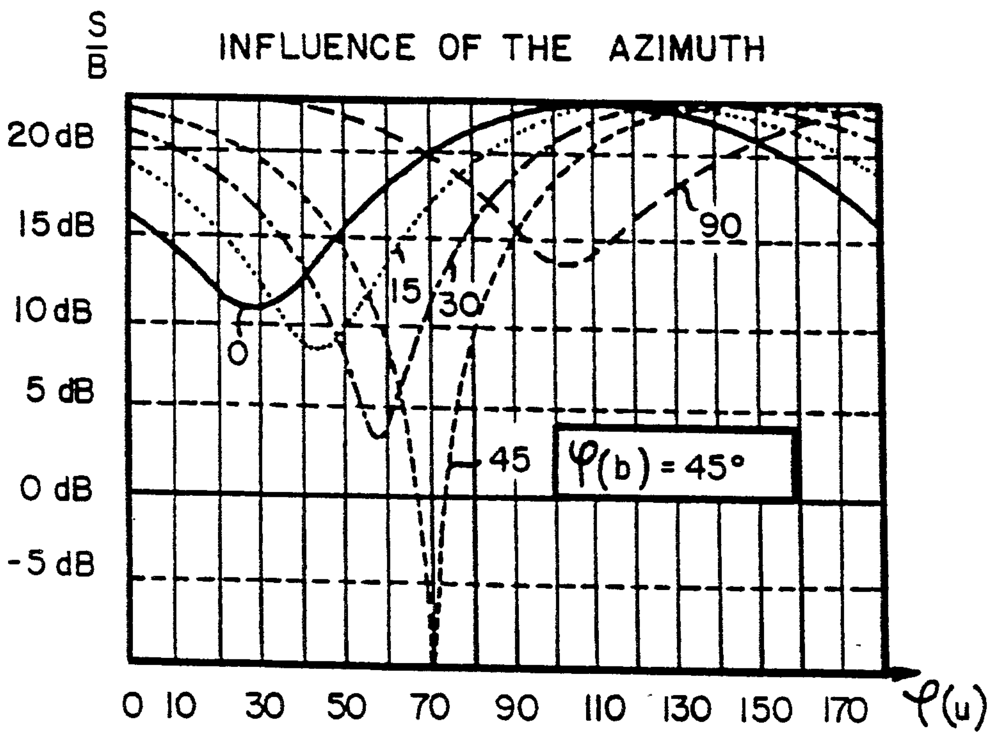
Figure 3H:
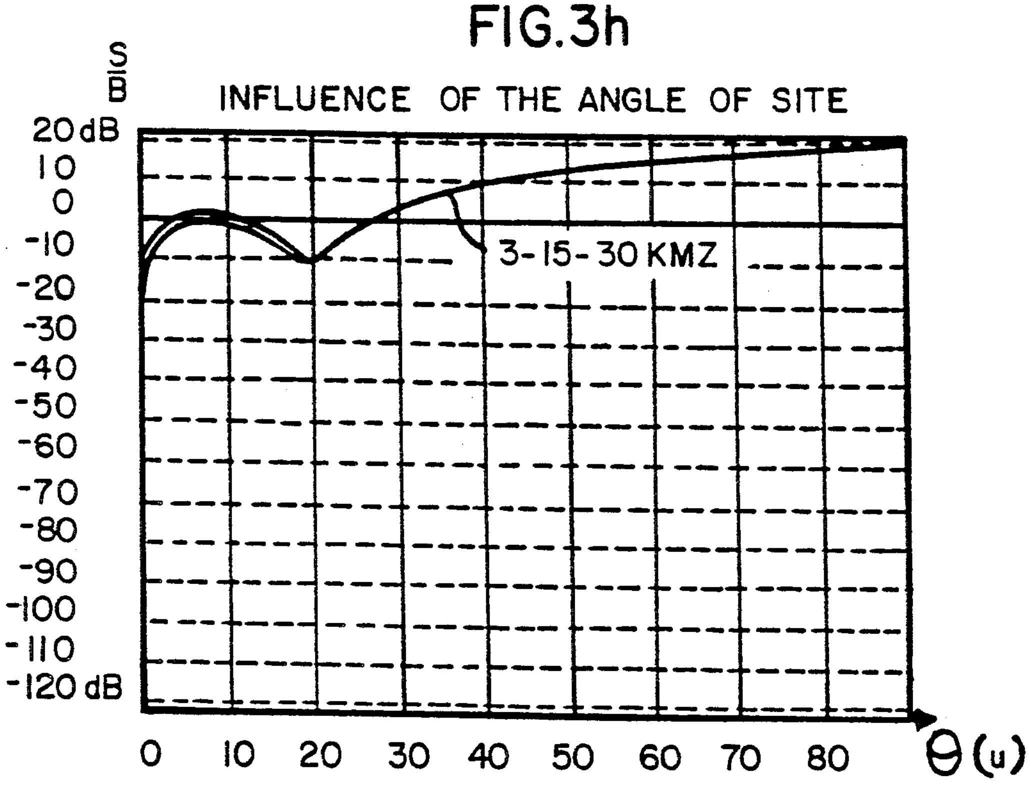
Figure 3I:
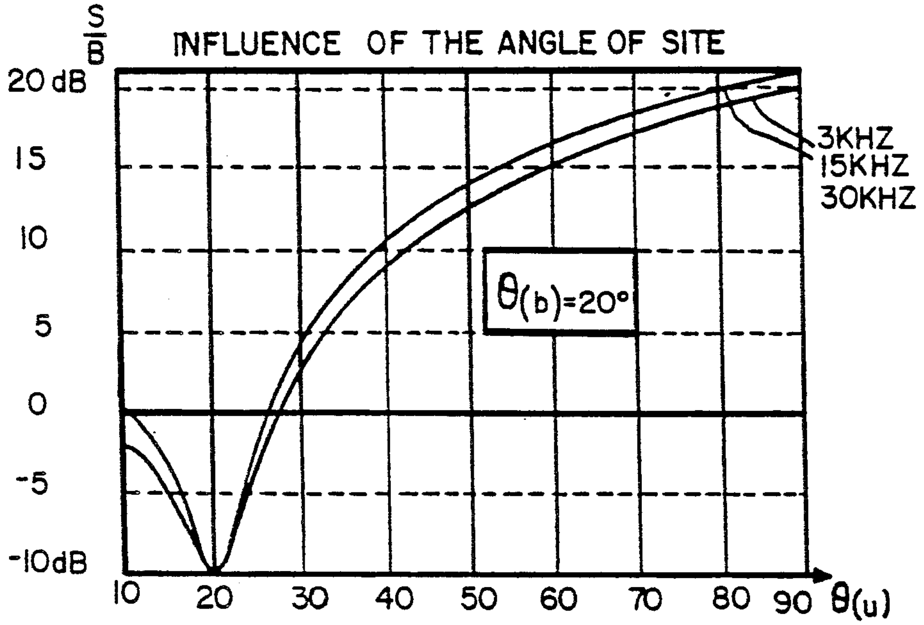
Figure 3J:
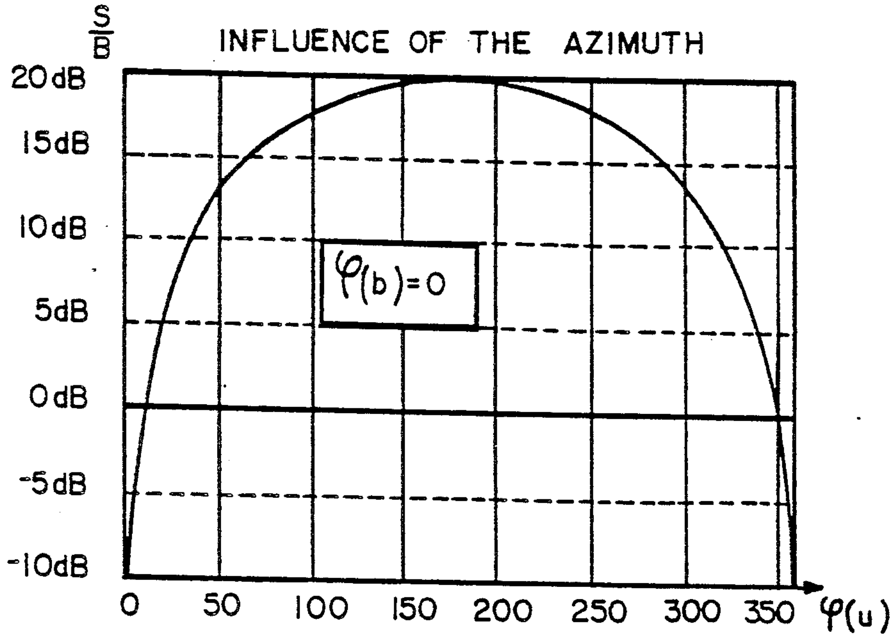
Figure 3K:
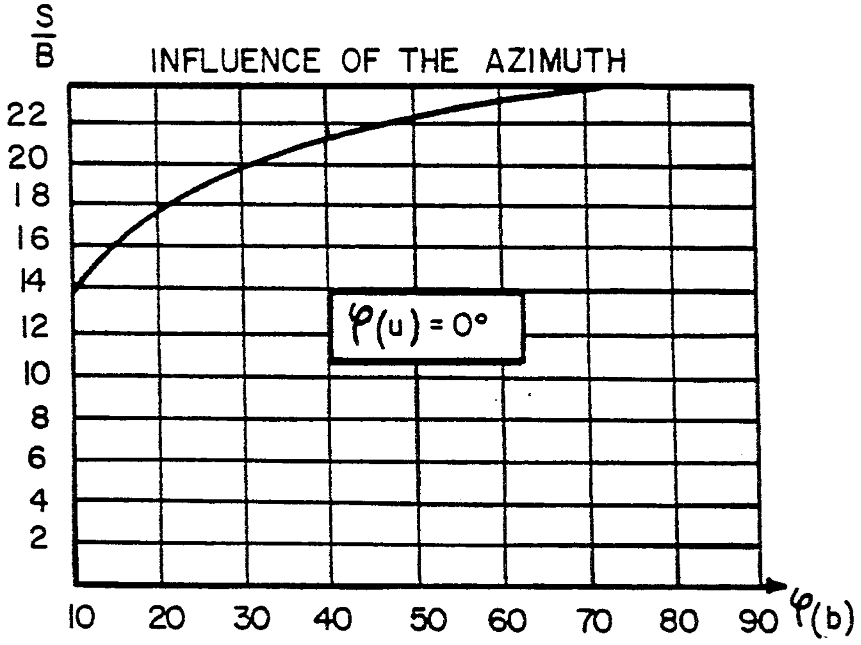

In most configurations, the adaptative aerial according to the invention carries, as the graphs in FIGS. 3*a*, 3*k* show, protection against interference at least equal to 20 decibels.

The latter illustrate results obtained for two adaptation types, the one exploiting the differences in polarization of the useful incident plane wave and the plane wave representing the interference, the other the differences of directions from where these same waves come. For the profiles of the corresponding curves, the notations in FIGS. 4*a* and 4*b*, on the one hand, and 5 on the other hand, have been used.

Figure 4A:
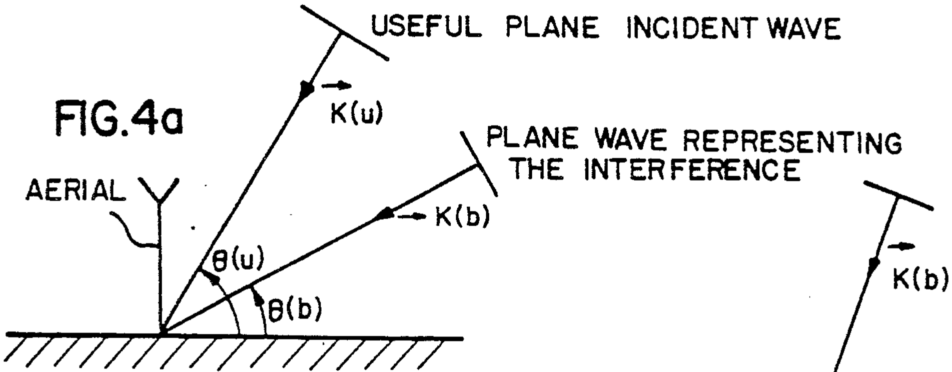
Figure 4B:
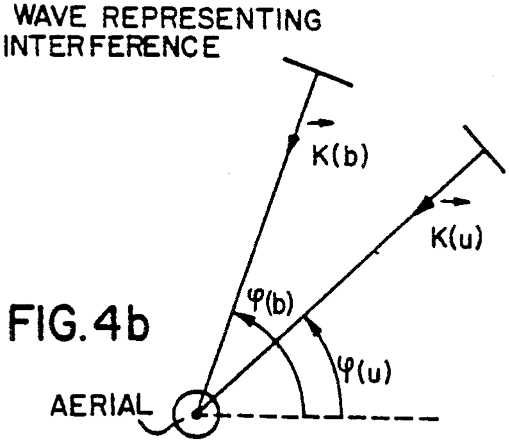

The angles θ(u) and θ(b) of site of arrival at the aerial of the useful plane wave and the interference are those shown in FIG. 4*a*. The corresponding azimuths φ(u) and φ(v) are shown in FIG. 4*b*.

Figure 5:
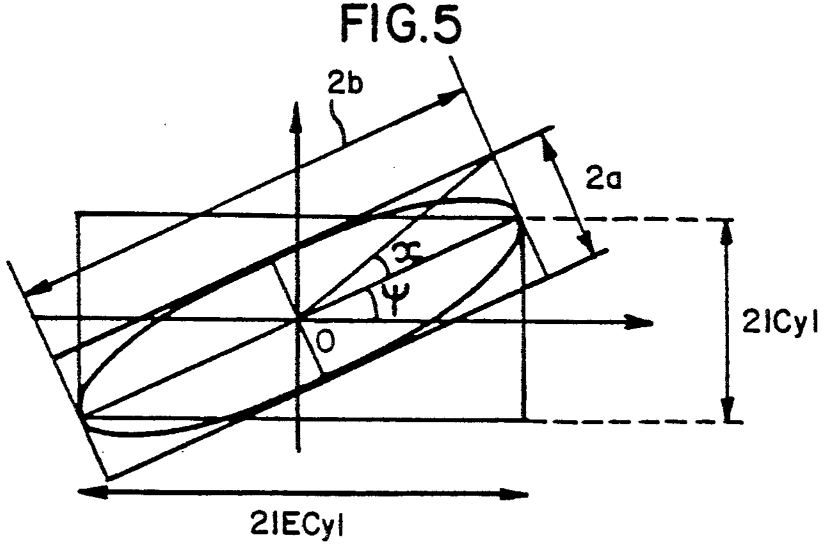

The characteristic angles χ and ψ of a wave polarized elliptically relative to an ortho-normal reference yoz are those shown in FIG. 5.

The angle χ is the angle of flattening of the ellipse defined by its major axes a and b. $\mathrm{Tan}_{\chi}=b/a$.

The angle ψ is the angle, reckoned positively in the trigonometric sense, between the axis oy and the major axis of the ellipse.

The influence of the polarization is shown in FIGS. 3*a* to 3*c*. In these figures, the curves shown correspond to identical directions of angles of arrival of the useful wave and of that of the interference, such that θ(u)=θ(b) and θ(u)=θ(b). In order to cancel the pattern effect, the angle of site θ(u)=θ(b) is chosen at 60°. The azimuthal angle is arbitrarily fixed at 45°. In tracing the curves, the angle ψb is placed on the abscissa and varies from 0° to 180°.

The angle χb is chosen as parameter and takes the values 30°, 15°, 0°, −15° and −30°.

And for each curve, one value (u) and of χ(u) is fixed. χ(u) varies from −45° to 45° with a step of 15°. ψ(u) varies from 0° to 180° with a step of 30°.

These curves illustrate that, in most cases, the signal/noise ratio obtained at the output of the summation circuit 14 is greater than 10 decibels. On fixing in this way the noise threshold at −10 decibels, it is apparent that the gain obtained is 20 db compared to a situation where there were no adaptation. This also shows that the system adapts very well in polarization. But quite clearly, it is also apparent that if the two waves, useful and interference, have equal direction and equal polarization, it is not possible to suppress the influence of the interference. Under these conditions, there is quite clearly obtained at the output of the summation circuit 14 a signal/noise ratio of −10 decibels which corresponds to the noise threshold of −10 decibels starting without adaptation. The polarization of the interference varies with the values ψ(b) represented as abscissa and χ(b) as parameter. It is noted that the best results are obtained for values χ(u) and χ(b) which have opposite signs. The signal/noise ratio increases like the absolute value χ(u)−χ(b). Finally, for large differences between χ(u) and χ(b), the signal/noise ratio attains values greater than 20 decibels—nearing 30 decibels. A total suppression of the interference may then be obtained.

The preceding remarks correspond to the general case. For rectilinear polarizations, that is to say for an ionospheric propagation at frequencies less than 3 MHz at night and less than 9 or 10 MHz during the day, profiles corresponding to the curves in FIGS. 3*d* to 3*g* may be obtained. In the first network of curves shown in FIG. 3*d*, the two waves have equal direction, the angle ψ(u) is chosen as parameter and the wave ψ(b) is chosen as variable. The results obtained show that the curves follow by translation relative to one another when the parameter ψ(u) varies.

The peak always occurs for ψ(u)=ψ(b) and has, in all cases, the same characteristics. The width of the peak is constantly less than 30° for a signal/noise ratio of 10 db. As the value of ψ(u) does not seem to be decisive, this value is fixed at 70° in FIG. 3*e*, whilst keeping ψ(b) as variable and θ(u)=θ(b) θ(b)=30°. It appears in FIG. 3*e* that a Δφ greater than or equal to 15° is always sufficient to obtain a signal/noise ratio of 10 decibels. This result can also be obtained for angles θ(u)=θ(b) greater than or equal to 30°.

The influence of the angle of site is shown in FIG. 3*f*. In this figure, the influence of the direction on the value of Δψ is shown. The angle θ(u) is fixed at 60° and θ(b) is taken as parameter and varies from 30° to 90°. It is again noted in this case that the interference is eliminated for ψ(b)=ψ(u)=70°.

The influence of the azimuth is shown in FIG. 3*g*, the azimuth of the interference φ(b) being fixed at 45° and the azimuth of the useful signal ψ(u) being chosen as parameter, φ(u) varying from 0° to 90°. Under these conditions, it is noted that the interference is eliminated when the azimuth φ(u) of the useful signal is equal to φ(b) that of the interference and that it is more or less clearly eliminated when the azimuth of the useful signal distances itself from that of the interference.

Finally, the influence of the angle of site and of the azimuth for identical polarizations of the useful waves and of the wave from a source of interference is shown in FIGS. 3*h* to 3*k*. In these illustrations the chosen polarizations are circular.

In FIG. 3*h*, the angle of site of the interference θ(b) is fixed at 20° and the angle of site θ(u) of the useful signal is carried as abscissa for values comprised from 0° to 90°. It appears that the signal/noise ratio is a minimum for the 90° value of the polarization, and that it is greater than 20 db for an angle of site separation greater than 40°.

FIG. 3*i* shows that there is little difference on the signal/noise ratio when the angle of site varies, for frequencies from 3 to 30 MHz.

In FIG. 3*j*, the useful wave and the wave from the source of interference have equal angle of site, the azimuth φ(b) of the interference is fixed at 0 and the azimuth φ(u) of the useful signal is chosen as parameter. The value of φ(u) is carried as abscissa and varies from 0° to 360°. It is noted that a difference of azimuthal angle greater than 40° is sufficient to obtain a gain of 20 decibels in signal/noise ratio.

Finally, FIG. 3*k* shows the influence of the azimuth φ(b) of the interference in relation to a fixed direction of the azimuth φ(u)=0° of the useful signal, for opposite circular polarizations with an equal angle of site. It is noted that, whatever the azimuth of the interference, the signal/noise ratio is greater than or equal to 14 decibels.

For transmission distances less than 800 km, it may be noted that the polarization is close to the right circular polarization or to the left circular polarization. In the absence of interference, it will then be possible to use solely the two crossed loops, phase shifted by + or $-\pi/2$ so as to obtain polarizations close to the right or left polarizations. The fact of choosing one of these polarizations has the advantage that it enables diminution of the depth of the fading. To this end, a switch may be placed on the receiver 15 so as to enable triggering of the adaptative function of the aerial so as to continuously suppress any possible interference.

Figure 6:
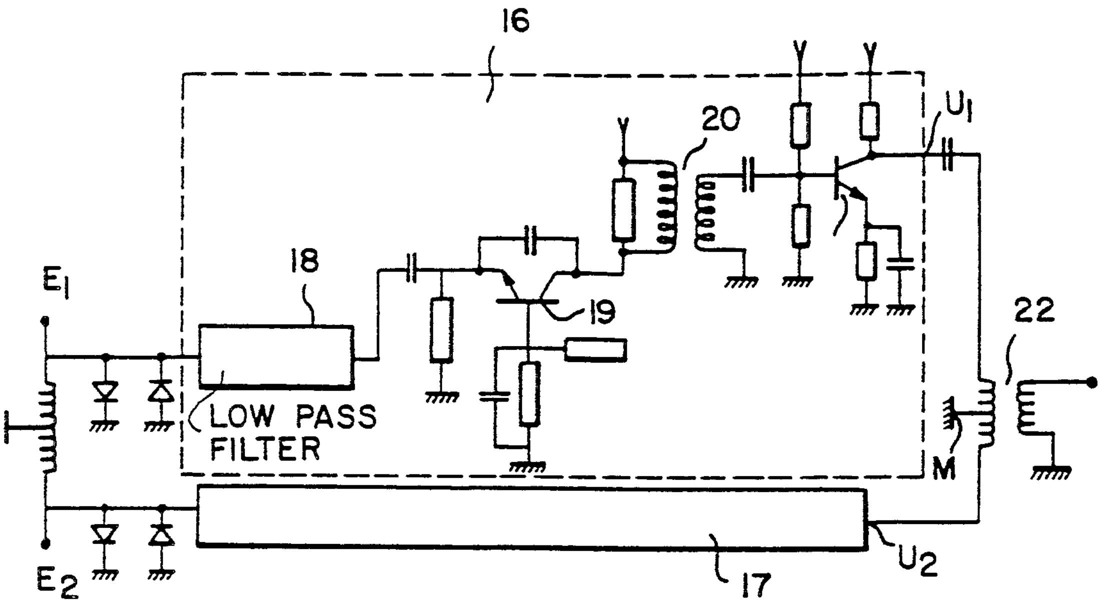

An embodiment of a symmetric amplifier 6 or 7 is shown in FIG. 6. This amplifier comprises two identical amplification channels 16 and 17 disposed symmetrically in relation to an earthed line M. As the two channels are identical, only the first channel 16 is shown inside a dashed line. It comprises, connected in series in this order, a low pass filter 18, a common-base biased amplifying transistor 19, coupled through an impedance transformer 20 to an amplifying transistor 21 biased in accordance with the common transmitting mode. The output of the first channel 16 is formed by the collector of the transistor 21.

The outputs $U_1$ and $U_2$ of the first and second channels 16 and 17 are connected respectively to the ends of the primary winding of an impedance transformer 22. The winding being mid-point connected to the earth circuit M. The inputs $E_1$ and $E_2$ of the first and second channels are formed by the inputs of the low pass filters 18 of each of the channels and are connected to the output terminals of the loops 1 and 2 of the aerial.

Figure 7:
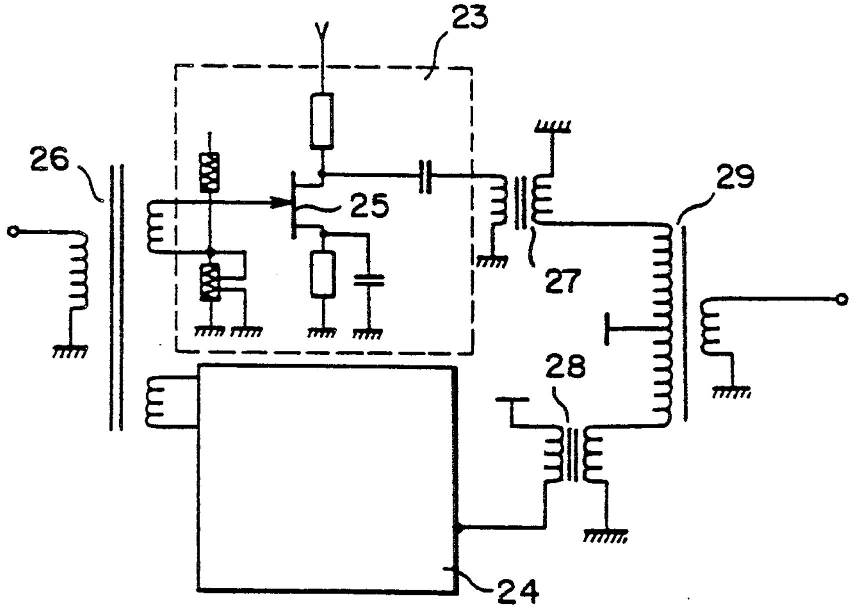

An embodiment of a nonsymmetric amplifier 8 is shown in FIG. 7.

It comprises two symmetric channels 23 and 24 each comprising an amplifier with field effect transistor.

An impedance-matching the transformer 26 comprising a primary winding ensures, through two secondary windings, the coupling of the filar aerial 3 to the grids of the transistors 25 of each of the channels. An impedance formed by the transformers 27, 28 and 29 reconstitutes into a single output signal the signals amplified by each of the channels 23 and 24.

We claim:

1. An antenna system for autoadaptive direction and polarization filtering of ratio waves traveling through an HF ionospheric channel and generating an output signal for coupling to a receiver, said antenna system comprising:

- at least a first and second crossed loop antenna elements disposed around a common axis in accordance with adjacent dihedrons of equal angular value, said first and second crossed loop antenna elements having first and second output terminals, respectively;
- a filar antenna element having a longitudinal axis along said common axis, said filar antenna element having a first end terminal situated at the same phase center as said first and second output terminals;
- a multiplier circuit for producing output products by multiplying each value output from said first and second output terminals and said first end terminal by a corresponding complex weighting coefficient, said complex weighting coefficients being adjustable as a function of variations of polarization of a received radio wave, and azimuthal and site arrival directions of said received radio wave; and
- a summation circuit for summing said output products to form a resultant signal which can be exploited by said receiver with a maximum useful signal/noise ratio.

2. An antenna system according to claim 1, wherein said complex weighting coefficients are selected so as to render maximum, quality of reception of said radio waves in the presence of interference.

3. An antenna system according to claim 1, wherein said complex weighting coefficients are selected so as to reduce depth of fading by polarization filtering.

4. An antenna system according to claim 1, further comprising a signal processor for determining said complex weighting coefficients based on said resultant signal, and outputting said complex weighting coefficients to said multiplier circuit.

5. An antenna system according to claim 4, wherein said signal processor calculates said complex weighting coefficients by comparing, through successive iterations, said resultant signal to a reference signal, said reference signal representing a desired resultant signal.

6. An antenna system according to claim 5, wherein said signal processor determines said complex weighting coefficients by a least squares method.

7. An antenna system according to claim 1, further comprising:

- symmetric amplifiers connected between said output terminals of said first and second crossed loop antennas and said multiplier circuit; and
- a non-symmetric amplifier connected between said first end terminal of said filar antenna element and said multiplier circuit.

8. An antenna system according to claim 7, further comprising:

- a plinth with said phase center of said first and second crossed loop antennas situated thereon; and
- a tripod supporting said plinth.

9. An antenna system according to claim 8, wherein said plinth encloses said symmetric and non-symmetric amplifiers, and said symmetric and non-symmetric amplifier have inputs connected directly to said first and second output terminals and said first end terminal respectively whereby distinct amplitude phase responses from said first and second crossed loop antenna elements and said filar antenna element for any elliptical polarized ionospheric wave transmitted in accordance with a specified side angle azimuth is received.

10. An antenna system according to claim 9, wherein said tripod includes legs formed of tubes; said multiplication circuit is external to the tripod; and said symmetric and non-symmetric amplifiers are connected to said multiplication circuit by coaxial cables inside said tubes.

11. An antenna system according to claim 10 wherein said first and second crossed loop antenna elements cross at an angle of 90° and said filar antenna element is placed at the intersection of said first and second crossed loop antenna elements.

12. An antenna system according to claim 11, wherein said first and second crossed loop antenna elements have a rectangular shape and said filar antenna element is connected to two opposite vertices situated on a same diagonal of said rectangular shaped first and second crossed loop antenna elements.

* * * * *